US010915918B2

(12) United States Patent
Bhattacharjee et al.

(10) Patent No.: US 10,915,918 B2
(45) Date of Patent: Feb. 9, 2021

(54) SYSTEMS AND METHODS FOR PROVIDING AUGMENTED REALITY EXPERIENCES

(71) Applicant: MASTERCARD INTERNATIONAL INCORPORATED, Purchase, NY (US)

(72) Inventors: Manash Bhattacharjee, Jersey City, NJ (US); Tyler C. Welsh, Brooklyn, NY (US); Akshita Goyal, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 305 days.

(21) Appl. No.: 15/867,085

(22) Filed: Jan. 10, 2018

(65) Prior Publication Data
US 2019/0213625 A1 Jul. 11, 2019

(51) Int. Cl.
*G06Q 30/00* (2012.01)
*G06Q 30/02* (2012.01)
*G06F 9/54* (2006.01)
*G06Q 20/10* (2012.01)
*G06F 16/9537* (2019.01)
*G06T 19/00* (2011.01)
*G06Q 50/12* (2012.01)
*G06T 11/60* (2006.01)

(52) U.S. Cl.
CPC ......... *G06Q 30/0239* (2013.01); *G06F 9/547* (2013.01); *G06F 16/9537* (2019.01); *G06Q 20/10* (2013.01); *G06Q 30/0222* (2013.01); *G06Q 50/12* (2013.01); *G06T 11/60* (2013.01); *G06T 19/006* (2013.01)

(58) Field of Classification Search
CPC .................................................. G06Q 30/0282
See application file for complete search history.

(56) References Cited

U.S. PATENT DOCUMENTS

| 2011/0225069 A1* | 9/2011 | Cramer | G06Q 30/06 705/27.1 |
| 2014/0100995 A1* | 4/2014 | Koshy | G06Q 30/0643 705/27.2 |
| 2018/0204266 A1* | 7/2018 | King | G06Q 30/0631 |

FOREIGN PATENT DOCUMENTS

WO    WO-2018165389 A1 *  9/2018  ........... G06Q 20/405

* cited by examiner

*Primary Examiner* — Meredith A Long
(74) *Attorney, Agent, or Firm* — Harness, Dickey & Pierce, P.L.C.

(57) ABSTRACT

Systems and methods herein are related to augmented reality (AR) experiences in connection with items offered by entities. One exemplary method includes receiving, at a computing device, an AR search request from a user where the AR search request includes a search criteria and a location. The computing device then searches in a memory for at least one entity consistent with the search criteria and the location. In turn, the computing device returns an AR search response to the user, at an application of a communication device associated with the user. The AR search response includes an AR quotient indicative of a level of an AR experience at the at least one entity, thereby permitting the user to identify the level of the AR experience at the at least one entity prior to deciding to visit the at least one entity.

18 Claims, 7 Drawing Sheets

SYSTEMS AND METHODS FOR PROVIDING AUGMENTED REALITY EXPERIENCES

FIELD

The present disclosure generally relates to systems and methods for providing augmented reality experiences, and in particular, to systems and methods for use in providing augmented reality experiences to users in connection with items offered to the users by one or more entities.

BACKGROUND

This section provides background information related to the present disclosure which is not necessarily prior art.

Consumers are known to purchase products from merchants. What's more, consumers are known to search for different merchants, for example, based on particular needs at particular times. For example, consumers may search for restaurant merchants when hungry, or in order to plan nights out with friends. The consumers are known to rely on review websites, such as, for example, the Yelp® website or the OpenTable® website, to find restaurant merchants within desired vicinities, to read reviews of the restaurant merchants, and, potentially, to initiate reservations at one or more of the restaurant merchants. Apart from the above websites, there is other content, more generally available on the Internet, related to merchants, including reviews, locations, product listings, menus, online ordering, etc.

In addition, merchants, including restaurant merchants, are known to offer incentives for consumers to purchase products. Incentives may be in the form of loyalty points, miles, etc., whereby rigid formulas are followed to provide the incentives to consumers. Alternatively, allocating the incentives may be less rigid, where managers or proprietors of the merchants provide complimentary products and/or discounts to consumers at the time of purchase without relying on points, miles, etc. Regardless of the manner, incentives are generally provided to appease consumers, keep consumers happy, and/or encourage further spending, at that time, or during a return visit to the merchants, by the consumers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers purchase products from merchants. Consumers, however, may have difficulty in locating specific merchants, to fulfill needs and/or desires at particular times and/or based on particular circumstances. Likewise, merchants, especially small-scale merchants, may find it difficult to identify repeat consumers from new consumers, whereby one offer, versus another offer, might be made. Uniquely, the systems and methods herein permit consumers to view and select from multiple merchants based on levels of augmented reality (AR) experiences at the merchants. In particular herein, a merchant may maintain a merchant profile with a data structure, where the merchant profile includes different indicators and/or content suitable for providing an AR experience to a consumer, when traveling to and/or present at the merchant. The level of AR experience, then, may be determined for the merchant, relative to other merchants, and represented as an AR quotient. Consequently, when a consumer is searching for a merchant (e.g., to fulfill a need or desire, etc.), a merchant meeting the search criteria specified by the consumer may be displayed to the consumer in an AR view, whereby the AR quotient of the merchant is visually apparent to the consumer. The consumer may then select the merchant based not only on relative distance to the consumer, for example, but also based on a level of AR experience at the merchant. Once selected, the consumer is provided the AR experience upon arrival at the merchant, whereby the consumer may purchase one or more items from the merchant. The merchant, then, is able to view one or more details about the consumer, upon entry at the merchant, subject to proper permissions and consents, whereby the merchant is able to offer incentives or other attention to the consumer while at the merchant. In this manner, consumers seeking AR experiences may be informed of the potential AR experiences at the merchants and select (or not select) the particular merchants accordingly, while, at the same time, the merchants are provided a way to differentiate themselves from other merchants through AR.

Figure 1:
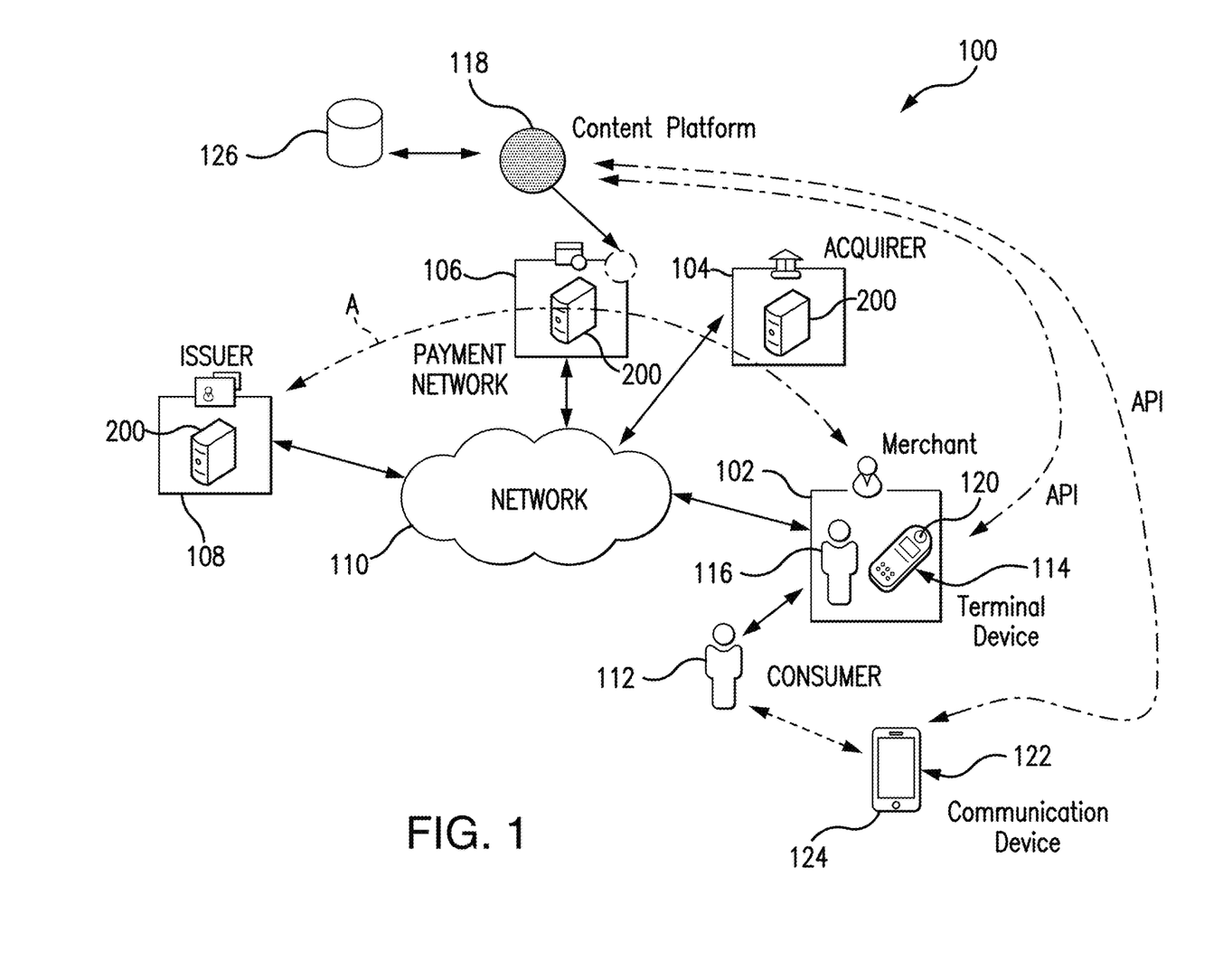
FIG. 1 is an exemplary system of the present disclosure suitable for use in providing augmented reality experiences to consumers in connection with items offered for sale by merchants.

FIG. 1 illustrates an exemplary system 100 in which one or more aspects of the present disclosure may be implemented. Although the system 100 is presented in one arrangement, other embodiments may include systems arranged otherwise depending, for example, on processing of payment account transactions, delivery of transaction data, manners in which payment account transactions are initiated, privacy concerns, manners of providing AR experiences, etc.

In the illustrated embodiment, the system 100 generally includes a merchant 102, an acquirer 104, a payment network 106, and an issuer 108, each coupled to (and in communication with) a network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the payment network 106, the issuer 108, and one or more various consumers in the system 100 (e.g., consumer 112, etc.), etc.

The merchant 102 in the system 100 is generally included to provide products for purchase by one or more consumers. The products may include any desired and/or suitable goods and/or services. The merchant 102, in this embodiment, offers the products for sale and further, often, provides (or otherwise delivers) the products to the consumers, upon purchase, at one or more physical locations of the merchant 102, often referred to as brick-and-mortar locations. As shown, the merchant 102 includes a terminal device 114, which may include, for example, a point of sale (POS) terminal, or other device for use, by a user 116 (e.g., an employee, a manager, an owner, etc.) at the merchant 102, to operate as described herein. That may include, for example, interacting with a content platform 118, as described below, completing payment account transactions (e.g., acting as a POS terminal, etc.), or otherwise receiving evidence of a purchase, etc. The terminal device 114 generally includes a merchant application 120, which includes computer-executable instructions, which, when executed by the terminal device 114, cause the terminal device 114 to operate as described herein.

With continued reference to FIG. 1, the consumer 112 is associated with a communication device 122, which may include, for example, a smartphone, a tablet or other suitable communication device. The communication device 122 includes a consumer application 124, which includes computer-executable instructions, which, when executed by the communication device 122, cause the communication device 122 to operate as described herein. The consumer application 124 may be any suitable consumer application, which is provided for consumers to search and/or locate merchants. The consumer application 124 may be linked to different sources of data related to the merchant 102, such as, for example, reviews, merchant popularity, etc. One exemplary consumer application includes the Yelp® network-based application. The consumer 112 is further associated with a payment account issued by the issuer 108. While the payment account may be any type of payment account, in this example, the payment account includes a credit payment account. What's more, in this exemplary embodiment, the consumer application 124 performs as a payment application, whereby the consumer application 124 includes a payment credential associated with the consumer's payment account (e.g., a token, a PAN, etc.). The payment credential may be provided to a merchant, such as, for example, the merchant 102, to initiate a payment account transaction thereat.

It should be appreciated that the issuer 108 may include a banking institution, a financial institution and/or another conventional institution, which offers one or more different types of accounts, including, for example, the payment account issued to the consumer 112. The acquirer 104, likewise, may include a banking institution, a financial institution and/or another conventional institution, which offers one or more different types of accounts, including, for example, a merchant account (e.g., for the merchant 102, etc.) into which funds may be transferred for purchase transactions.

While one merchant 102, one terminal device 114, one acquirer 104, one payment network 106, one issuer 108, one consumer 112, and one communication device 122 are included in the system 100 illustrated in FIG. 1, it should be appreciated that any number of these entities, devices, and/or persons (and their associated components) may be included in the system 100, or may be included as a part of systems in other embodiments, consistent with the present disclosure.

Figure 2:
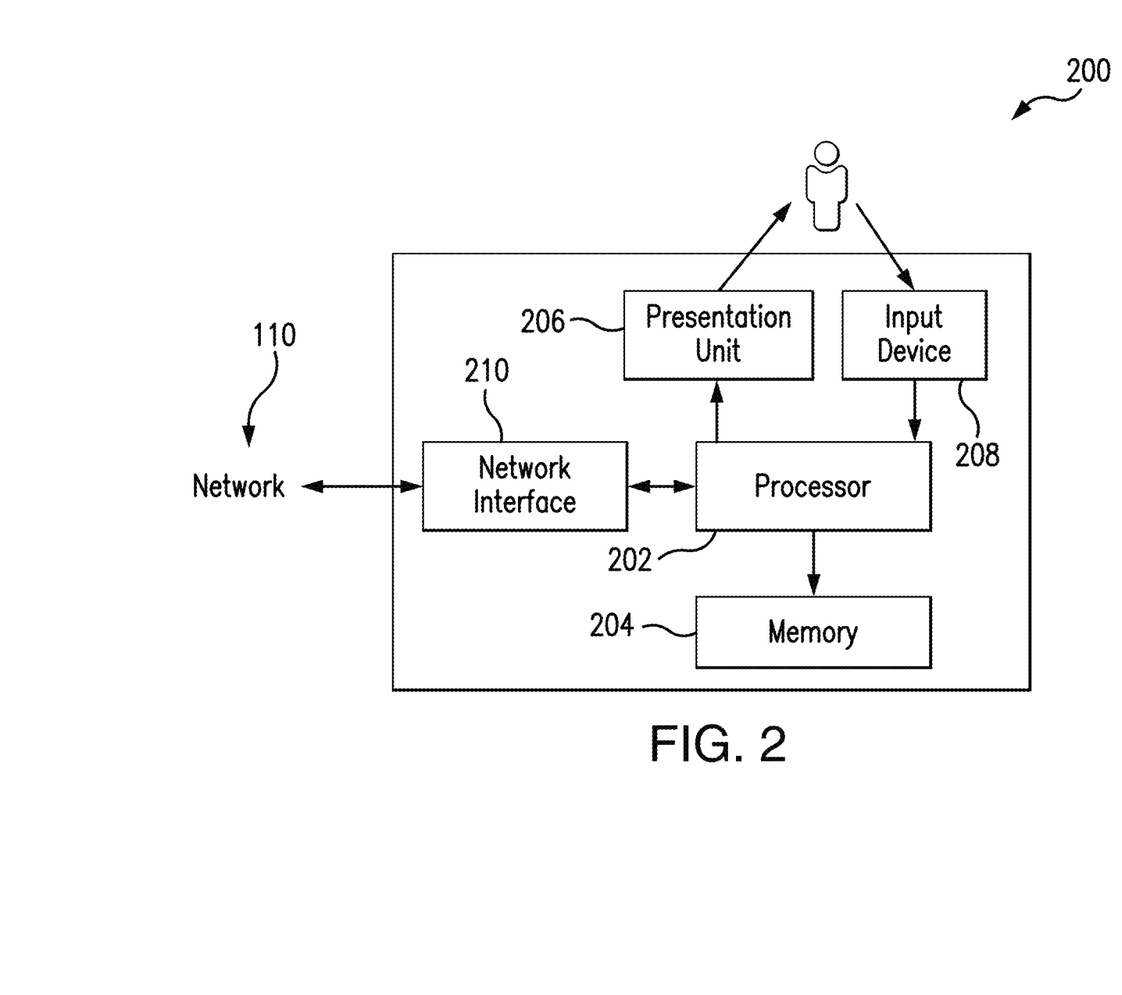
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In particular, in the exemplary system 100 of FIG. 1, each of the acquirer 104, the payment network 106, and the issuer 108 are illustrated as including, or being implemented in, computing device 200, coupled to the network 110. In addition, the merchant 102 may be considered as including and/or as being implemented in one or more computing devices consistent with computing device 200. Further, the merchant's terminal device 114 and the communication device 122 may each be considered a computing device consistent with computing device 200. That said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, offers, payloads, and/or other types of data (and/or data structures) suitable for use as described herein. Furthermore, in various embodiments, computer-executable instructions (as generally described herein) may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., offers, etc.), either visually or audibly to a user of the computing device 200, for example, the consumer 112 or the user 116 in the system 100, etc. Various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

Further, the computing device 200 includes an input device 208 that receives inputs from the user (i.e., user inputs) such as, for example, a selection of a merchant, statements of searches, etc. The input device 208 is coupled to (and is in communication with) the processor 202 and may include, for example, a keyboard, a pointing device, a mouse, a camera, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to/with one or more different networks, including the network 110. Further, in some exemplary embodiments, the computing device 200 may include the processor 202 and one or more network interfaces (including the network interface 210) incorporated into or with the processor 202.

Referring again to FIG. 1, the system 100 includes the content platform 118 and a data structure 126 coupled to the content platform 118. The content platform 118 is specifically configured, by executable instructions, to perform one or more of the operations herein. In connection therewith, the content platform 118 and the data structure 126 may each be considered a computing device consistent with computing device 200. While the content platform 118 and the data structure 126 are illustrated as separate parts of the system 100, one or both may be incorporated into one or more other computing devices included in the system 100 (e.g., into computing device 200, etc.). In addition, while data structure 126 is illustrated as separate from the content platform 118, in other embodiments the data structure 126 may be included in, or integrated in, the content platform 118, for example, in memory 204 therein, etc.

In this exemplary embodiment, the data structure 126 includes multiple merchant profiles, which include information related to the merchant 102 (and other merchants) and items offered by the merchant 102 in the form of a merchant ID, merchant metadata, item IDs, and item metadata. And, the particular information or content included (or linked or referenced) in the merchant profile may then be displayed or used as part of an augmented reality (AR) experience (as described more hereinafter).

In connection therewith, merchant metadata for the merchant 102 (as included in the merchant profile for the merchant 102) may include, for example, a merchant name, merchant details (e.g., a description of the merchant 102 and products offered thereby, etc.), a merchant location, a merchant category, a merchant photo, hours particular to the merchant 102 (e.g., hours of operation, etc.). And, item metadata for the merchant 102 may include, for example, item names, item details (e.g., item descriptions, item pricing, etc.), item categories, hours particular to given items (e.g., where the merchant is a restaurant/bar, hours particular to a happy hour, breakfast, lunch, dinner; etc.), multi-dimensional item images (e.g., three-dimensional images, etc.), multiple images of items (e.g., to render three-dimensional views of the items, 360-degree views of the items, views of the items from different angles, views of different parts of the items, close-up views of the items, etc.), AR dimensions of the image(s) for the items, AR resolutions of the image(s) for the items, a video(s) of the items, blogging content related to the items, and/or third-party content related to the items, etc. In some embodiments, item metadata may (or may not) include content from a third-party platform(s) separate or remote from the data structure 126 (e.g., aggregated content, etc.). Additionally, or alternatively, item metadata in such embodiments may include a link or reference to content hosted at a third-party platform(s), whereby the linked or referenced content may be accessed via the data structure 126.

Regardless of the specific types of merchant metadata and item metadata, in general, each merchant profile, including the profile for merchant 102, for example, includes each item offered by the merchant 102 (e.g., products (including goods and/or services), incentives, etc.). In addition, the merchant profile for the merchant 102 may include (or reference) additional content related to the merchant 102 and/or items offered by the merchant 102, such as, for example, feedback, reviews, ratings, scores, item popularity at the merchant 102 (e.g., frequency of purchase relative to other items, etc.), etc. The merchant profile may also include (or reference) ingredient lists and/or recipes (e.g., where the merchant 102 is a grocery store or restaurant, etc.). In this manner, item metadata for a particular item may include a reference to a particular ingredient list and/or recipe that is related to the item (or type thereof) (e.g., where the item (or type thereof) is included in the ingredient list and/or recipe, etc.), or the ingredient list and/or recipe itself. Item metadata may also include item IDs for one or more related and/or companion items (e.g., where the merchant 102 is a grocery store and the item is a box of pasta, item IDs for items that are pasta sauces; etc.). Item metadata may further include the geographic coordinates of where the item is disposed at the merchant 102.

The content platform 118 is configured to interact with the merchant 102, as described below, to receive and store items associated with the merchant 102, and also with the consumer 112, to aid the consumer 112 in locating the merchant 102 in response to one or more needs and/or desires.

Specifically, the user 116 associated with the merchant 102, either at the merchant 102 or remote therefrom, requests to add an item to a merchant profile for the merchant 102, which is stored in the data structure 126. In this example, it should be appreciated that the profile for the merchant 102 has already been created and supplied with information (e.g., by the user 116 via the terminal device 114 or another computing device 200, etc.), whereby the profile for the merchant 102 includes a merchant ID for the merchant 102 and merchant metadata. Then, to add the item, the user 116 accesses the merchant application 120 (e.g., at the terminal device 114 in this example, etc.) and provides an item ID for the item and item metadata (consistent with one or more types of item metadata discussed above). The terminal device 114, in turn, is configured, by the merchant application 120, to call an application programming interface (API) exposed by the content platform 118. The API call includes the merchant ID for the merchant 102, the item ID and item metadata, etc. It should be appreciated that the merchant ID may be stored by the terminal device 114 (e.g., when the user 116 created the profile for the merchant 102, etc.) or it may be provided by the user 116 to the terminal device 114. In either case, the content platform 118, in response to the API call, is configured to call another API exposed by the data structure 126, in which the content platform 118 provides an application ID for the merchant application 120 along with the merchant ID and a payload related to the item (e.g., the item ID, item metadata, etc.). Thereafter, the data structure 126 is configured to store the item as part of the merchant profile therein (e.g., in memory 204, etc.), whereby the item ID and item metadata represents an item (and information associated therewith) in the merchant profile.

Then, the data structure 126 is configured to transmit a confirmation to the content platform 118, which is configured to provide the confirmation to the merchant application 120. The confirmation includes, in this example, a code associated with the confirmation (e.g., for purposes of record keeping, etc.).

Subsequently, from time to time, the consumer 112 may desire or need to patronize a merchant or purchase a particular item from a merchant (such as, for example, merchant 102). In response to that need/desire, the consumer 112 accesses the consumer application 124, at the communication device 122. The consumer 112 then enters search criteria for the need and/or desire (e.g., a merchant category (e.g., bar, restaurant, pharmacist, etc.), a merchant location and/or distance (e.g., within 0.25 miles, etc.), an item category (e.g., happy hour, lunch, vitamins, etc.)). In response to the search criteria, the communication device 122 is configured, by the consumer application 124, to provide a search criteria call (e.g., an API call, etc.), to the content platform 118. The search criteria call includes a payload having the search criteria provided by the consumer 112, or part thereof. It should be appreciated that the search criteria entered by the consumer 112 (and included in the payload), in general, may include any information consistent with one or more types of merchant or item metadata included in a merchant profile in the data structure 126 (as generally described above), whereby the search criteria may be used (e.g., by the data structure 126, etc.) to filter information or metadata in the data structure 126 to provide relevant results.

The content platform 118 is configured to submit the search criteria call, or the payload therein, via an API, to the data structure 126. The data structure 126 is configured to then search, in memory (e.g., the memory 204, etc.), and specifically, within the merchant profiles included in the memory. For example, the content platform 118 may be configured to use search criteria from the consumer 112 in keyword searching the memory. Additionally, or alternatively, the data structure 126 may be configured to search based on a category indicated or included in the search criteria. For example, the search criteria "happy hour" may be identified to a bar category of merchants, whereby items from merchants within the bar category (which otherwise meet the search criteria) are found by the search.

When one or more items are identified, from the search, the data structure 126 is configured to provide a search response to the content platform 118. The search response includes, for each identified item, an AR quotient, and one or more types of merchant metadata (consistent with the above), and or one or more types of item metadata (consistent with the above). Again, for each identified item, merchant metadata included in the search response may include, for example, a merchant name, a merchant description, a merchant category, and/or a location, etc. Item metadata, for each identified item, may include, for example, an item name, an item pricing, an item category, a three-dimensional image, an AR dimension for the image, an AR resolution for the image, third-party content (e.g., blogging content, etc.), etc. It should of course be appreciated that the data structure 126 may be configured in various embodiments to return more or less types of merchants and item metadata.

When the search is complete, the content platform 118 is configured to pass the search response back to the communication device 122. The communication device 122 is configured, by consumer application 124, to display the search result, included in the search response, or part thereof, in an AR view to the consumer 112 at the presentation unit 206 thereof. Initially, the merchants in the AR view are visually distinguished (e.g., by color, intensity, etc.) based on the AR quotient associated with the merchants, whereby a merchant with a higher AR quotient may be more visible, for example. The consumer 112 may then choose to navigate toward a merchant with a greater AR quotient, than others, to take advantage of a higher AR experience (i.e., the AR quotient may be indicative of a level of the AR experience available at the merchant, relative to other merchants or in general, as discussed in more detail below in relation to FIG. 4).

When the consumer navigates to one of the merchants, as instructed and/or indicated through the augmented reality view, the communication device 122 is configured, by the consumer application 124, to determine the presence of the consumer 112 at the merchant 102 and to transmit a request for an AR merchant experience to the content platform 118. The request includes the merchant ID for the merchant 102 at which the consumer 112 is located. The content platform 118, in turn, is configured to submit the request for the AR merchant experience to the data structure 126. The data structure 126 is configured to then search in memory, and specifically, the merchant profile for the merchant corresponding to the merchant ID. The search result includes, for example, an AR quotient, merchant metadata, and item metadata included in the merchant profile. The data structure 126 is configured to return the search results to the content platform 118, which is configured to, in turn, pass the search results to communication device 122. The search results may, again, include one or more types of merchant metadata (e.g., merchant name, category, details, etc.) and one or more types of item metadata (e.g., for each item, item name, item details (e.g., pricing, etc.), a three-dimensional image of the item; etc.) (consistent with the above). It should be appreciated that the data structure 126 may be configured in various embodiments to return more or less types of merchant and item metadata.

Further in the system 100, the communication device 122 is configured, by the consumer application 124, to display the search results, in response to the request for the AR merchant experience, as the consumer 112 browses at the merchant 102. In particular, the communication device 122 is configured, by the consumer application 124, to capture various areas and/or items of the merchant 102 when in frame of the camera input device 208 of the communication device 122, whereby the areas and/or items in frame are displayed on the presentation unit 206 of the communication device 122 for the consumer 112 to view. When an item in frame is included in the merchant profile and within a sufficient proximity of the camera input device 208, the communication device 122 is configured, by the consumer application 124, to overlay, in real-time, item metadata as AR content on the image and/or video captured by the camera input device 208. Item metadata overlaid as AR content may include, for example, the item name, item details (e.g., an item description, pricing, etc.), an item image (e.g., a three-dimensional image, etc.), etc. Item metadata overlaid as AR content may further include, for example, a suggested companion item(s) and/or an ingredient list(s) and/or recipe(s) related to the item (or type thereof) (e.g., where the merchant 102 is a grocery store and an item in frame is a box of noodles, a suggested companion item may include pasta sauce and/or recipes that call for noodles; etc.). Where, for example, a suggested companion item(s) is overlaid as AR content, an image(s) (e.g., a three-dimensional image(s), etc.) for the companion item may also be overlaid as AR content (e.g., automatically or based on the consumer's selection of a companion item in an overlaid list of companion items, etc.).

The consumer 112 is permitted to then select one or more of the items of the merchant 102 for purchase (e.g., via an input to the communication device 122, etc.). In particular, the communication device 122 is configured, by the consumer application 124, to permit the consumer 112 to select the one or more items in the frame of the camera input device 208 as part of the AR experience, or in some embodiments, from a list of items displayed via the consumer application 124.

When selected, the communication device 122 is configured, by the consumer application 124, to initialize a payment account transaction, via a payment application incorporated, in whole or in part, with the consumer application 124, or via a payment application separate therefrom. The communication device 122 may be configured, by the payment application, to solicit authentication from the consumer 112, whereupon the consumer 112 is authenticated in response to a code, biometric, etc. When authenticated, the payment application is configured to provide a payment account credential to the consumer application 124 (and/or payment application, as appropriate) in the communication device 122.

The communication device 122, then, is configured, by the consumer application 124 (and the payment application associated therewith, for example), to interact with the merchant 102 (and the terminal device 114, for example) to cause a payment account transaction for the selected product(s). In connection therewith, the merchant 102 generates an authorization request for the transaction to be funded by the consumer's payment account (e.g., based in data received from the communication device 122 and the corresponding payment application, etc.) and communicates the authorization request to the acquirer 104. The authorization request is transmitted along path A in the system 100. In turn, the acquirer 104 communicates the authorization request to the issuer 108 along path A, generally through the payment network 106, such as, for example, through MasterCard®, VISA®, Discover®, or American Express® payment networks, etc. Upon receipt, the issuer 108 determines if the consumer's payment account is in good standing and if there are sufficient funds and/or credit to cover the transaction. If approved, an authorization reply (indicating the approval or decline of the transaction) is transmitted by the issuer 108 back to the merchant 102, again along path A, thereby permitting the merchant 102 to complete the transaction (when approved). The transaction is later cleared and/or settled by and between the merchant 102, the acquirer 104, and the issuer 108.

Alternatively, in connection with the transaction initiated by the consumer application 124 at the merchant 102, the communication device 122 (and the consumer application 124) may be configured to activate the payment application at the communication device 122, whereby the payment application (as is generally conventional) transmits a request for the transaction (broadly, pushes the transaction) directly to the issuer 108 (as associated with the consumer's payment account). Upon receipt, the issuer 108 determines if the consumer's payment account is in good standing and if there are sufficient funds and/or credit to cover the transaction. If approved, a reply (indicating the approval or decline of the transaction) is transmitted by the issuer 108 back to the communication device 122. When authorized, the communication device 122 is configured, by the consumer application 124, to provide a transaction confirmation to the merchant 102, whereby the merchant 102 is permitted to deliver the item to the consumer 112.

In other embodiments, in connection with the transaction initiated by the consumer application 124 at the merchant 102, the communication device 122 (and the consumer application 124) may be configured to activate the payment application at the communication device 122, whereby the payment application (as is generally conventional) transmits a request for the transaction (broadly, pushes the transaction) to the payment network 106. And, the payment network then generates an authorization request for the transaction, and transmits the authorization request to the issuer 108. Upon receipt, the issuer 108 determines if the consumer's payment account is in good standing and if there are sufficient funds and/or credit to cover the transaction. If approved, an authorization reply (indicating the approval or decline of the transaction) is transmitted by the issuer 108 back to the merchant 102, again along path A, thereby permitting the merchant 102 to complete the transaction (when approved). The transaction is later cleared and/or settled by and between the merchant 102, the acquirer 104, and the issuer 108.

In view of the above, it should be appreciated that the content platform 118 and/or data structure 126 may serve as an AR content platform, whereby an AR quotient and merchant and item metadata may be used by parties other than the party hosting the content platform 118 and/or data structure 126 to provide an AR experience to a consumer. For example, one party may provide the merchant application 120 and consumer application 124, while another party may host the content platform 118 and/or data structure 126. Or, two different parties may provide the merchant application 120 and consumer application 124, while a third party provides the content platform 118 and/or data structure 126. That said, in some embodiments, the party hosting the content platform 118 and/or data structure 126 may be the same as the party providing either (or both) the merchant application 120 and consumer application 124.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions herein, subsequently for one or more of the different purposes described herein.

Figure 3:
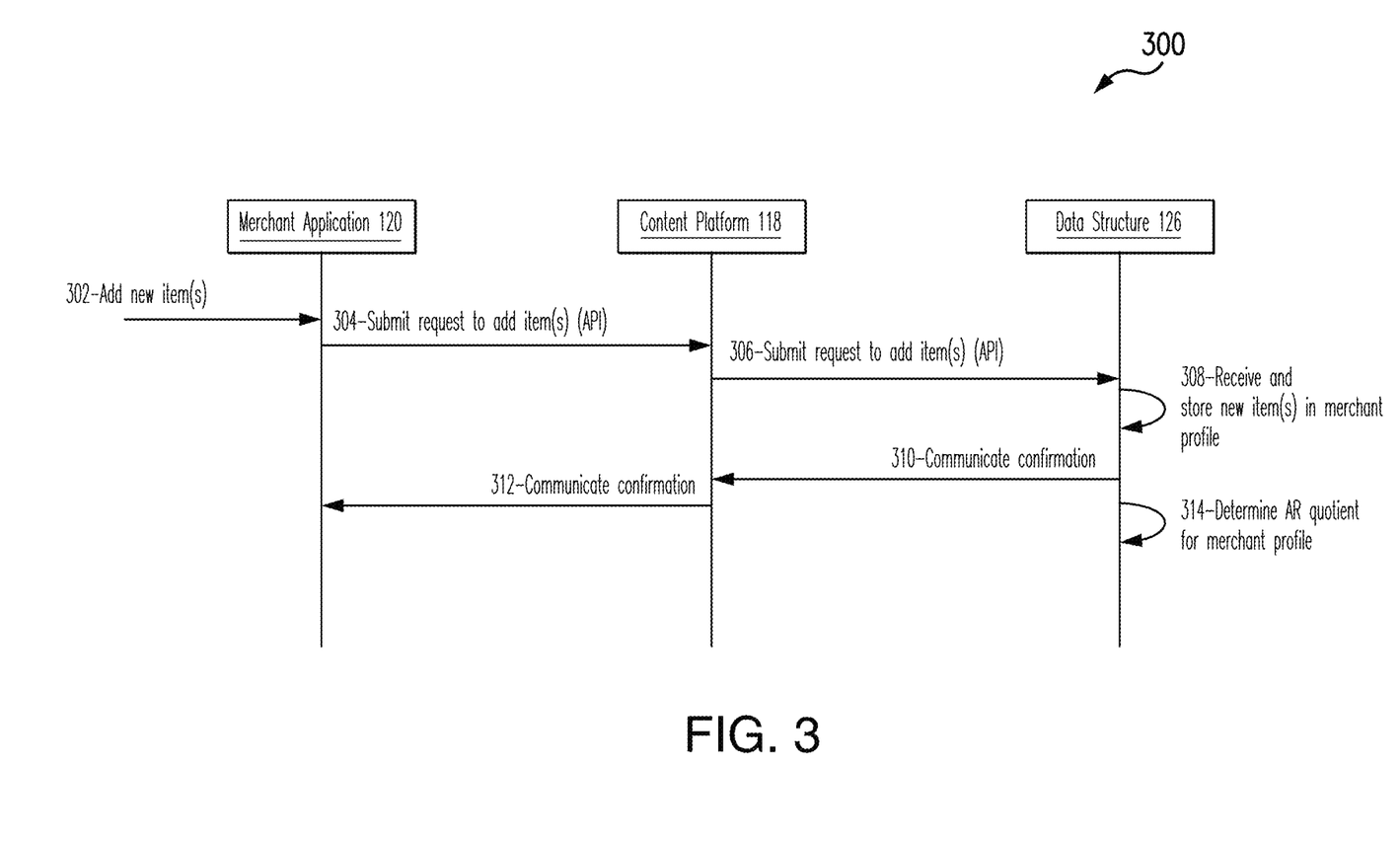
FIG. 3 is an exemplary method that may be implemented in the system of FIG. 1 for use in permitting merchants to maintain merchant profiles including items offered for sale by the merchants.

FIG. 3 illustrates an exemplary method 300 for use in building a merchant profile in connection with augmented reality (AR) experiences. The exemplary method 300 is described as implemented in the merchant 102, the terminal device 114, the merchant application 120, the content platform 118 and the data structure 126, and more generally in the system 100, and further with reference to computing device 200. However, it should be understood that the method 300 is not limited to this configuration of the system 100, as the method 300 may be implemented, at least in part, in other parts in system 100, or in multiple other computing devices or systems. As such, the methods herein should not be understood to be limited to the exemplary system 100 or the exemplary computing device 200, and likewise, the systems and the computing devices herein should not be understood to be limited to the exemplary method 300.

In connection with the method 300, the merchant 102 is registered to the content platform 118 and/or the data structure 126. As such, a merchant profile for the merchant 102 is included and stored in memory of the data structure 126. The merchant profile may include any data related to the merchant 102, including, for example, a merchant ID, merchant metadata, an item ID for each item available from the merchant 102 (which may be a product (including a good and/or service), an incentive associated with the merchant 102, etc.), and item metadata, whereby an AR content for the merchant 102 and the items offered by the merchant 102 may be provided.

As shown in FIG. 3, when the merchant 102 adds a new item for offering to consumers, the merchant 102 accesses the merchant application 120 (at the terminal device 114), at 302, whereby the merchant 102 intends to include the item(s) in the merchant profile at the data structure 126. The new item may include a new product, or may include an incentive to be offered to the consumers. In this example, the item to be included is a new menu for the merchant 102, which is a restaurant in this embodiment. The menu includes images of each of the entrees on the new menu, along with product descriptions and pricings for the new menu. As such, when the user 116 accesses the merchant application 120, the user 116 adds, via the terminal device 114, the new menu with the images, descriptions and prices. The images are each associated with an image ID, and the entrees on the menu are each associated with an item ID, and the item(s) are further associated with metadata (consistent with the above).

In turn in the method 300, at 304, the merchant application 120 calls the API associated with the content platform 118, whereby the merchant application 120 submits a request to add the item(s) to the merchant profile of the merchant 102. The API request includes the merchant ID for the merchant 102, the item ID for each new product item associated with the menu item, item metadata, and the image ID for each image of each new item. The content platform 118 then calls the API associated with the data structure 126, at 306, whereby the content platform 118 submits a request to add the new item(s) to the merchant profile for the merchant 102. The request, from the content platform 118 to the data structure 126, includes, without limitation, an application ID (i.e., for the merchant application 120 from which the merchant request originated), the merchant ID, and a payload (e.g., for each item, this includes the item ID, item metadata (e.g., the item image, item description, pricing, etc.), and image ID for each image; etc.). In response, the data structure 126 receives and stores, at 308, the new item(s) to the merchant profile. The data structure 126 then communicates a confirmation, having a confirmation code, back to the content platform 118, at 310, and the content platform 118 returns the confirmation, having the confirmation code, back to the merchant application 120, at 312. In this manner, the merchant 102, via the merchant application 120, is able to maintain the merchant profile at the data structure 126, which may include adding, updating, etc. items offered by the merchant 102 from time to time. Again, the item(s) may be products or services offered for sale, or potentially, even, an incentive(s) to the consumer 112.

It should be appreciated that after adding a new item(s) to the merchant profile of the merchant 102, the merchant 102 may later access the merchant application 120 via the terminal device 114 to remove the item(s). In this manner, the user 116 may enter (or select) an item ID(s) associated with the item(s) to be removed. The merchant application 120, then, may call the API associated with the content platform 118, whereby the merchant application 120 may submit a request to remove the item(s) from the merchant profile of the merchant 102. The API request may include the merchant ID for the merchant 102 and the item ID for each item to be removed. In turn, the content platform 118, then, may call the API associated with the data structure 126 (based on the request from the merchant application 120), whereby the content platform 118 may submit a request to remove the item(s) from the merchant profile for the merchant 102. The request, from the content platform 118 to the data structure 126, may include, without limitation, the application ID, the merchant ID, and the item ID(s). In response, the data structure 126 may delete the item(s) from the merchant profile for the merchant 102 and communicate a confirmation (potentially, having a confirmation code) back to the content platform 118. The content platform 118, then, may return the confirmation back to the merchant application 120.

Where the merchant 102 desires to remove the entire merchant profile for the merchant 102 and/or all items in the merchant profile, the merchant 102 may access the merchant application 120 via the terminal device 114 to do so. In this manner, the user 116 may enter (or select) a merchant ID associated with the merchant profile of the merchant 102 or items to be removed. The merchant application 120, then, may call the API associated with the content platform 118, whereby the merchant application 120 may submit a request to remove the merchant profile for the merchant 102 or to remove all items from the merchant profile of the merchant 102. The API request may include the merchant ID for the merchant 102. The content platform 118, then, may call the API associated with the data structure 126, whereby the content platform 118 may submit a request to remove the merchant profile or all items from the merchant profile. The request, from the content platform 118 to the data structure 126, may include, without limitation, the application ID and the merchant ID. In response, the data structure 126 may delete the merchant profile for the merchant 102 or all items in the merchant profile and communicate a confirmation (potentially, having a confirmation code) back to the content platform 118. The content platform 118, then, may return the confirmation back to the merchant application 120.

With continued reference to FIG. 3, based on the merchant profile (and, potentially, a search entered by a consumer), the data structure 126 may determine, at 314, an AR quotient for the merchant 102. In this exemplary embodiment, the AR quotient includes a value within the range of zero to 10000, where the lower the number/quotient the lesser the AR experience for the merchant 102. Further, in the exemplary embodiment, the AR quotient may be determined based on AR quality, AR quantity, AR relevance, and/or AR accuracy for the merchant 102 (examples of which are discussed in more detail below). It should be appreciated, of course, that the AR quotient may be determined based on additional, fewer, or other factors in various embodiments and that AR quality, AR quantity, AR accuracy, and/or AR relevance may be based on additional, fewer, or other factors (aside from those discussed below) in various embodiments.

It should also be appreciated that the AR quotient may be determined (and/or updated) when a new item request is received at the data structure 126 (or later), when an item remove request is received at the data structure 126 (or later or before), and/or determined in response to a search criteria call to the data structure 126 (e.g., where the AR quotient is based at least in part on AR relevance, etc.). When determined (and/or updated) when a new item request is received (or later) or when an item remove request is received (or later or before), the AR quotient may be stored in memory 204 of the data structure 126, as part of the merchant profile. When determined in response to a search criteria call to the data structure 126, the AR quotient may not (but may be) stored in the memory 204 of the data structure 126, as part of the merchant profile.

In this exemplary embodiment, AR quality is based on the quality of the AR content associated with the items in the merchant profile, such as, for example, the AR dimensions and AR resolutions associated with the items in the merchant profile (or averages thereof) (e.g., whereby higher dimensions and/or resolutions indicate higher quality of AR content, etc.). AR quality may also be based on, for example, a ratio of the number of items in the merchant profile associated with three-dimensional images to the total number of items in the merchant profile (e.g., whereby a higher ratio indicates a higher quality of AR content, etc.). As an example, a retailer having a merchant profile with 1000 items, each associated with a three-dimensional image, may have a higher AR quality than a retailer having a merchant profile with 1000 items, where only 500 of those items are associated with a three-dimensional image. AR quality may be further based on, for example, the total number of images associated with all items in the merchant profile or the average number of images associated with each item in the merchant profile.

AR quantity is based on the quantity of AR content associated with the items in the merchant profile, such as, for example, the number of items in the merchant profile associated with AR content. As an example, a large retailer that offers thousands of items for sale, where each item is associated with AR content in the retailer's merchant profile may have a higher AR quantity than a restaurant that has a menu of less than fifty items in the restaurant's merchant profile (even if all fifty items are associated with AR content in the restaurant's merchant profile). Further, AR quantity may additionally, or alternatively, be based, for example, on a ratio of the number of items in the merchant profile associated with AR content to the total number of items in the merchant profile (e.g., whereby a higher ratio indicates a higher AR quantity, etc.). As such, it should be appreciated that the AR quantity and/or AR quality may be based, at least in part, on the depth of the AR experience available for the merchant 102 and a number of variables associated with the AR experience (e.g., the average number of images associated with each item in the merchant profile, etc.).

AR accuracy may be based on user feedback and/or social sentiment associated with the AR experience for the merchant 102. For example, via the consumer application 124, the consumer 112 participating in an AR experience for the merchant 102 may be able to provide feedback to rate the AR experience (e.g., on a scale of 1 to 5 stars, etc.), whereby an average rating for the merchant 102 may be maintained. Further, the content platform 118 and/or data structure 126 may mine social media data (e.g., Twitter™ or Facebook™ posts, etc.) to determine a degree of social sentiment for an AR experience at the merchant 102 (e.g., the number of posts referencing the merchant 102, containing the words "AR" or "augmented reality," and containing words or phrases connoting positivity (e.g., "great," "excellent," "recommend," etc.), whereby a greater number of such posts may indicate a better AR experience; etc.). In some embodiments, the average rating and/or degree of social sentiment may be stored by the content platform 118 and/or data structure 126 in memory in the profile for the merchant 102 (e.g., as merchant metadata, etc.). It should be appreciated that, in some embodiments, where a merchant offers an AR experience via a consumer application, in additional to online via a website (e.g., using the same or similar AR content, etc.), AR accuracy may be based, at least in part, on user feedback and/or social sentiment associated with the AR experience offered online via the website.

And, AR relevance is based on the relevance of the merchant 102 providing the AR experience to a consumer (e.g., to a consumer's search, etc.). Such relevance may be based, for example, on the category of the merchant 102, location of the merchant 102, and/or items included in the merchant profile for the merchant 102. A merchant 102 having a higher relevance to a consumer will have a higher AR relevance. For example, where the consumer 112 searches at 5:00 pm for a happy hour within 0.25 miles, a "bar" merchant located 0.5 miles away from the consumer 112 (e.g., as determined by GPS, etc.) offering a happy hour from 4:30 pm to 6:30 pm may have a higher AR relevance than a "bar" merchant located 0.25 miles away from the consumer 112 offering a happy hour from 5:30 pm to 6:30 pm. It should be appreciated that, in general, AR relevance may be determined based on any one of a variety of factors included in the given consumer's search and based on the merchant and/or item metadata included in the profiles for the merchants in the data structure 126.

Figure 4:
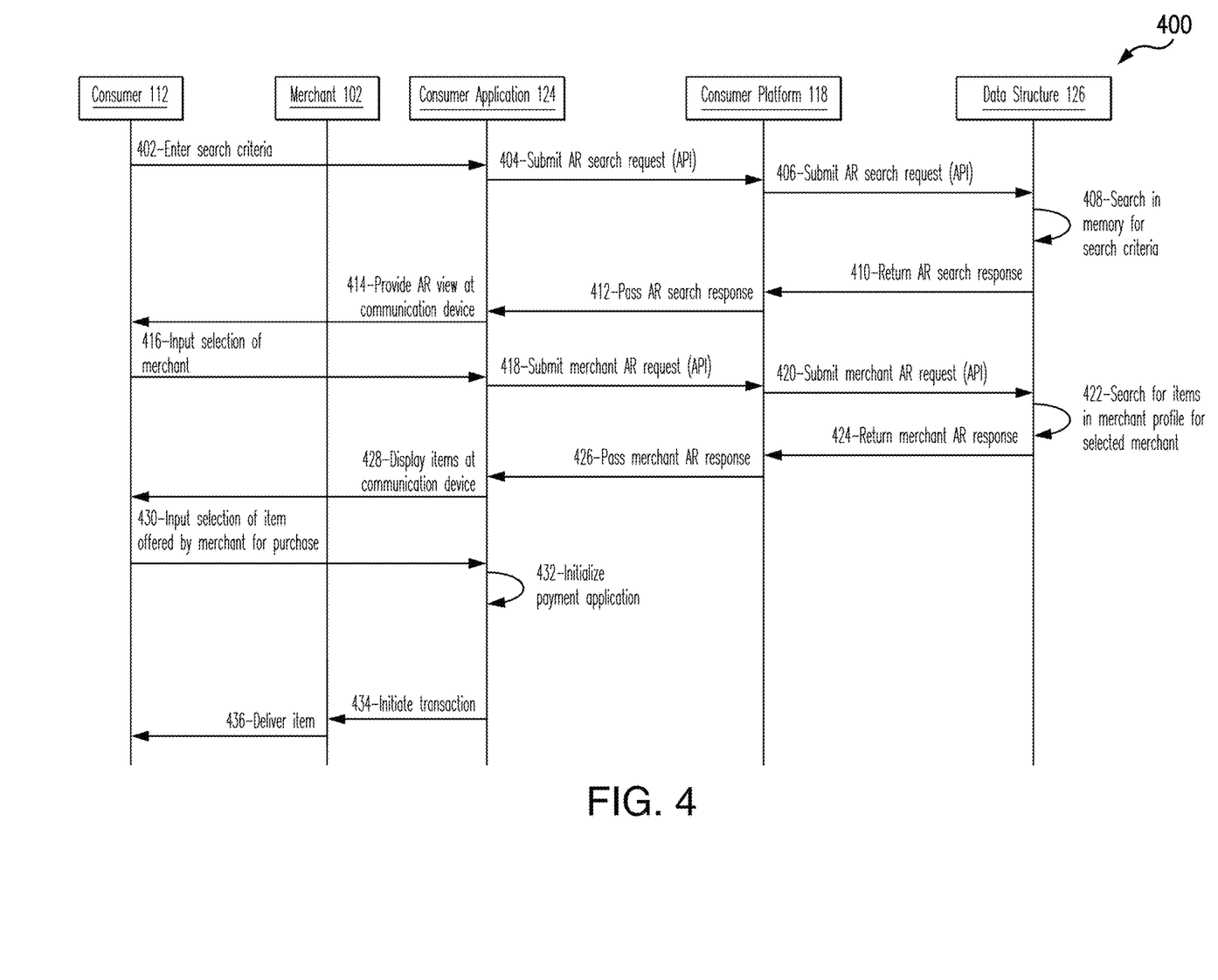
FIG. 4 is an exemplary method that may be implemented in the system of FIG. 1 for use in providing augmented reality experiences to consumers in connection with items offered for sale by merchants.

FIG. 4 illustrates an exemplary method 400 for use in facilitating an augmented reality experience in connection with items offered for sale by a merchant. The exemplary method 400 is described as implemented in the merchant 102, the communication device 122, the content platform 118 and the data structure 126, and more generally in the system 100, and further with reference to computing device 200. However, it should be understood that the method 400 is not limited to this configuration of the system 100, as the method 400 may be implemented, at least in part, in other parts in system 100, or in multiple other computing devices or systems. As such, the methods herein should not be understood to be limited to the exemplary system 100 or the exemplary computing device 200, and likewise, the systems and the computing devices herein should not be understood to be limited to the exemplary method 400.

Initially in the method 400, the consumer 112 has a desire or a need for a product and/or a merchant, whereby the consumer 112, at 402, enters search criteria to the consumer application 124 in the communication device 122 based on the desire or need. The search criteria may be in the form of keywords, such as, for example, food type (or item category) (e.g., Italian, Mexican, etc.), merchant type (or merchant category) (e.g., grocery store, pharmacy, etc.), etc., which may be generic to multiple merchants. The search criteria may further include a proximity or location, such as a postal code, or a within X miles of current location statement, etc. In this example, the consumer 112 enters the keywords "happy hour" and specifies within two miles as additional search criteria. That said, it should be appreciated that consumer 112 may be able to relay to the consumer application 124, and/or inform the consumer application 124 of, his/her desire and/or need through other words, numbers, or phrases (e.g., "Bank X in 12345", etc.). With as much or as little detail as the consumer 112 knows or is willing to provide and/or in a manner consistent with the type of metadata stored in merchant profiles in the data structure 126.

Figure 5:
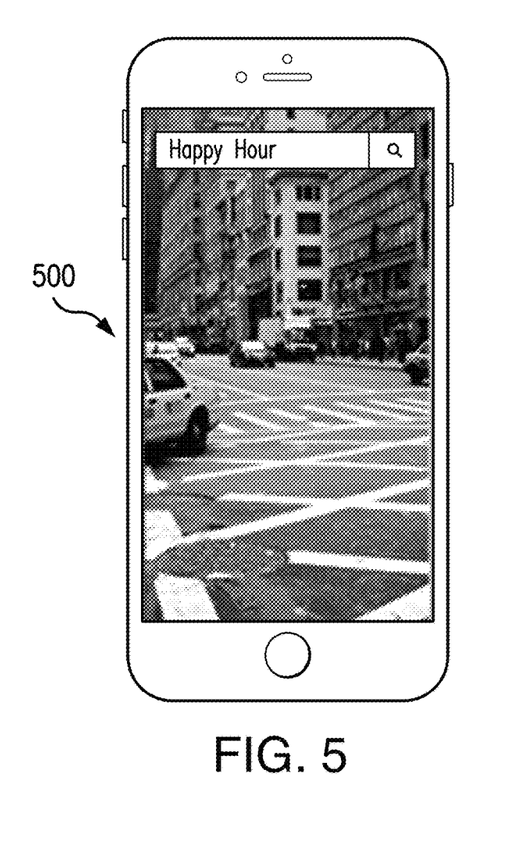
FIGS. 5-9 are exemplary interfaces that may be provided, from a network-based consumer application, at a communication device associated with a consumer, to permit the consumer to select a merchant through an augmented reality experience.

FIG. 5 illustrates an exemplary interface 500 that may be provided from the consumer application 124 and where the illustrated interface 500 includes a view from a camera input device 208 of the communication device 122, in which the consumer 112 enters the example search criteria "happy hour."

Referring again to FIG. 4, in response to such search, the consumer application 124 calls the API associated with the content platform 118, at 404, whereby the consumer application 124 submits an AR search request for a merchant consistent with the search criteria (e.g., for the search "happy hour"). The AR search request includes a payload, which includes, without limitation, the search criteria entered by the consumer 112, an application ID associated with the consumer application 124, and a location of the consumer 112, as determined by the communication device 122 (e.g., via GPS, etc.). The content platform 118 then calls the API associated with the data structure 126, at 406, whereby the content platform 118 submits the AR search request including the payload to the data structure 126. With that said, it should be appreciated that the payload may include more or less data than received from the consumer application 124 (e.g., the content platform 118 may append the application ID of the consumer application 124 to the request, etc.).

Upon receipt of the AR search request, the data structure 126 searches, at 408, in the memory associated therewith (e.g., memory 204, etc.), and specifically, in the merchant profiles included in the memory to find one or more merchants that are consistent with the search criteria (e.g., the "happy hour" search criteria in the above example) and/or location (e.g., within a vicinity of the communication device's location). When one or more matches is identified (i.e., search result(s)), the data structure 126 returns an AR search response to the content platform 118, at 410. The AR search results include, for each search result, merchant metadata and, specifically, an AR quotient. The content platform 118, in turn, passes, at 412, the AR search response back to the consumer application 124. In passing the AR search response to the consumer application 124, the content platform 118 may, or may not, modify the AR search response (i.e., to include more or less data, etc.).

The consumer application 124 then provides an AR view, at 414, at the presentation unit 206 of the communication device 122, whereby the search results are displayed as appropriate. In particular, a view from a camera input device 208 of the communication device 122 may be displayed at the presentation unit 206. And, in that view, the search results may be included via an indicator (e.g., a pin, a flag, an arrow, an outline, etc.), where the indicator is also potentially representative of the AR quotient. That is, for example, when the indicator is a pin, the size of the pin in the view at the communication device 122 may be indicative of the relative AR quotient.

Figure 6:
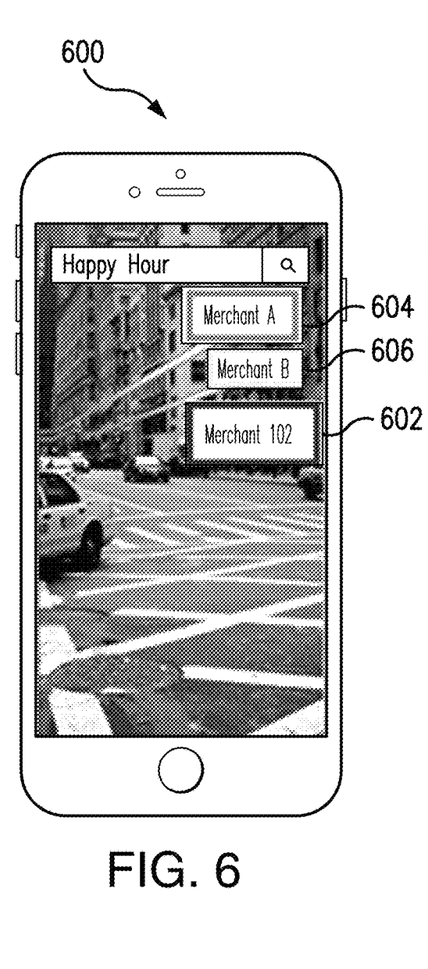

In connection therewith, FIG. 6 includes an exemplary interface 600, in which the street view (of FIG. 5) from the camera input device 208 of the communication device 122 is shown, with indicators 602, 604, and 606 associated with three merchants, i.e., merchant 102, merchant A, and merchant B, respectively. Each of the indicators 602, 604, and 606 may be identified by a different color in connection with the corresponding AR quotient for the merchant. For example, the indicator for the merchant 102 may be red, the indicator for the merchant A may be orange, and the indicator for the merchant B may be yellow. Here, the color range from white to yellow to orange to red may indicate an increasing AR quotient, where each represents an AR quotient of 0-2000, 3000-5000, 6000-7000, 8000-10000, respectively. As such, in this example, the red indicator for the merchant 102 generally indicates a higher AR quotient than the yellow indicator for merchant B. It should be appreciated that any suitable range may be applied to any suitable number of color variations in other embodiments. Likewise, apart from color, the size of the indicator may be indicative of the AR quotient, where the larger the indicator the higher the AR quotient. As shown in FIG. 6, for example, the indicator 602 for the merchant 102 is larger than the indicators 604 and 606 for either of merchants A and B, and the indicator 604 for merchant A is larger than the indicator 606 for merchant B. In yet another example, the merchants may be shown in series, or in a listing in the street view, or other view, whereby the merchants are sorted, listed, arranged, etc. by the AR quotient, or some other detail, of the merchant, with the AR quotient being otherwise visually indicated. As should be understood, the AR quotient may be visually or otherwise distinguished in any number of ways in the AR view provided, by the consumer application 124, to the consumer 112.

Then in the method 400, in response to the exemplary interface 600, for example, and more generally, the AR view provided by the consumer application 124 in FIG. 6, the consumer 112 inputs, at 416, a selection of one of the merchants, and, in this example, the merchant 102. The selection may be received as an input to an interface, such as a selection to the interface 600 selecting "Merchant 102." Additionally, or alternatively, the consumer 112 may input a selection of a merchant by traveling to the location of the merchant, whereby the consumer application 124 pairs the location of the communication device 122 to a location of a merchant included in the search result (e.g., based on GPS, etc.), thereby receiving the consumer's inputted selection of that merchant.

In turn, based on the selection by the consumer 112, the consumer application 124 calls the API associated with the content platform 118, at 418, whereby the consumer application 124 submits a merchant AR request to the content platform 118, where the merchant AR request includes the merchant ID associated with the selected merchant, i.e., the merchant 102 in this example. While the consumer's selection, in this example, includes an input to the communication device 122 (e.g., a selection of the merchant 102 at the interface 600 of FIG. 6, etc.), the consumer's input may simply include the consumer's presence at the merchant 102, whereby the consumer application determines the consumer's location to be within the merchant 102 and then provides the merchant AR request based on the consumer's location.

Next, the content platform 118 provides the merchant AR request, at 420, via an API call, to the data structure 126. The data structure 126, in turn, at 422, searches, in memory, for items included in the merchant profile for the merchant ID of the selected merchant (i.e., as included in the merchant AR request). The data structure 126 then returns, at 424, a merchant AR response including the merchant metadata (e.g. merchant name, merchant photo, merchant category, merchant details, etc.), AR quotient, and item metadata (e.g., for each item in the profile, item name, item detail (e.g., pricing, etc.), item image(s) (e.g., a three-dimensional image, etc.); etc.) to the content platform 118, at 424. And, the content platform 118 passes the merchant AR response to the consumer application 124, at 426.

Figure 7:
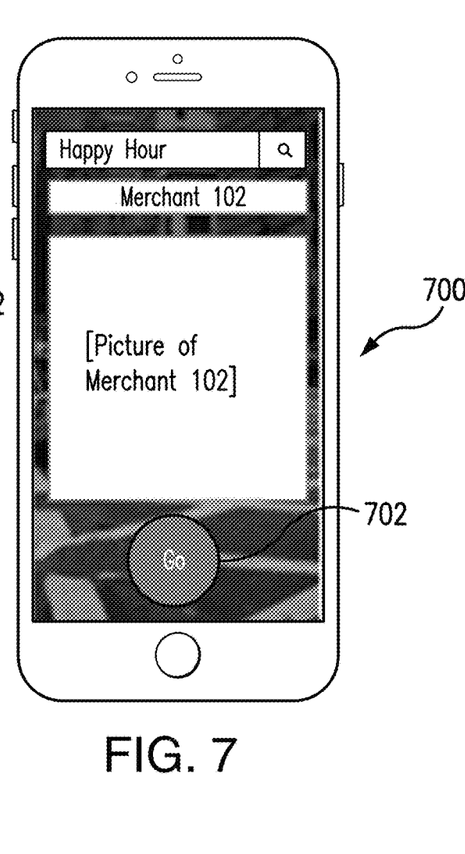
Figure 8:
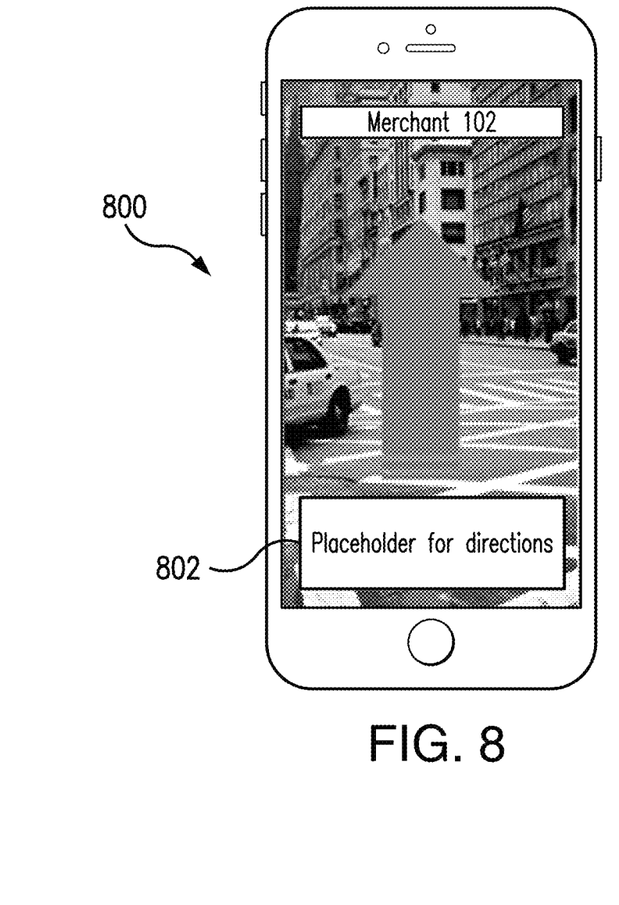
Figure 9:
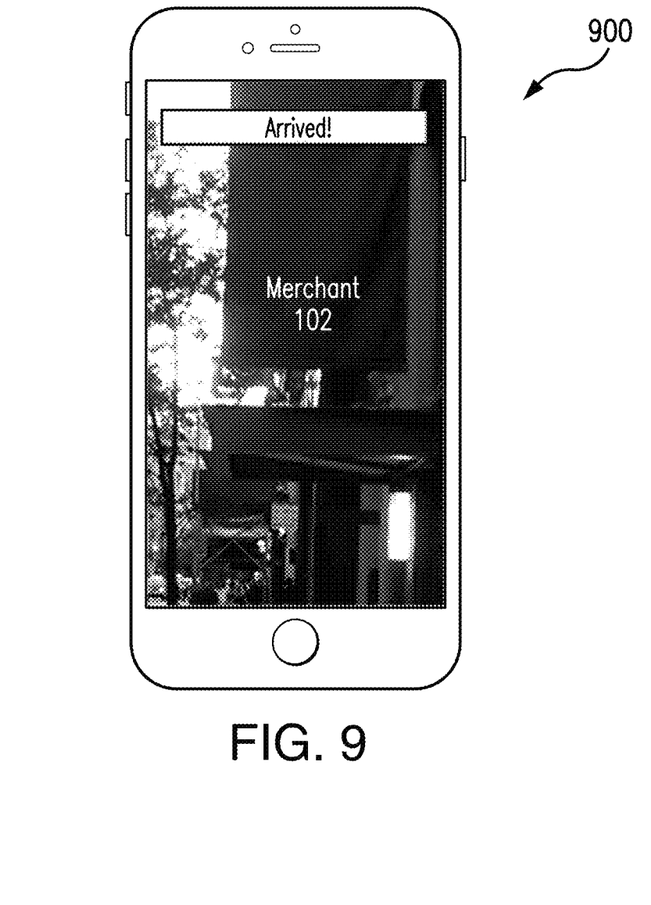
Figure 10A:
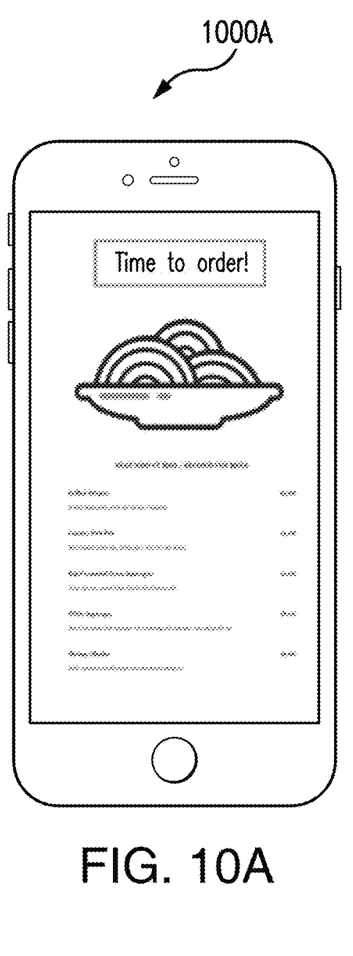
FIGS. 10A-10D are exemplary interfaces that may be provided, from a network-based consumer application and related to a merchant, at a communication device associated with a consumer, when the consumer is located at the merchant.
Figure 10B:
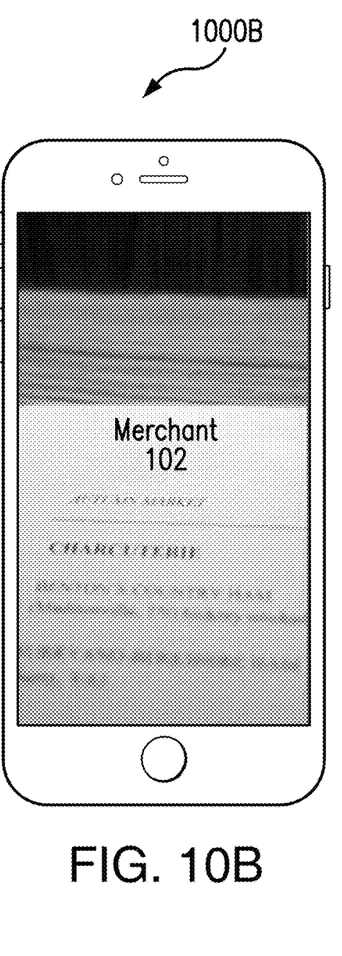
Figure 10C:
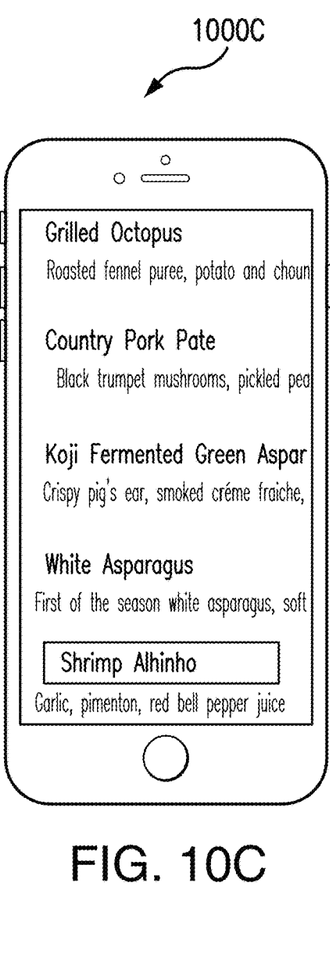
Figure 10D:
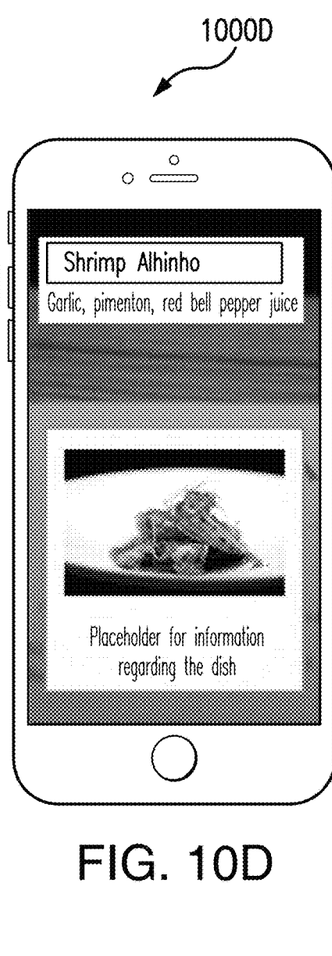

In the meantime, and as shown in FIG. 7, the consumer application 124 may present an exemplary interface 700 to the consumer 112 (at the communication device 122), to offer navigation to the selected merchant, i.e., to the merchant 102 (when the merchant 102 was select at exemplary interface 600 of FIG. 6). As shown, the exemplary interface 700 includes the name and, potentially, further content related to the merchant 102 (e.g., item metadata (e.g., an item image (e.g., an image of an entrée, etc.), etc.) or other merchant metadata (e.g., an image of a building of the merchant 102, etc.), etc.). And, when the consumer 112 selects a "Go" button 702, the consumer application 124 causes an exemplary direction interface 800, as shown in FIG. 8, to be displayed to the consumer 112, at the presentation unit 206, whereby, between the interface 800 and variations thereof, the consumer 112 is navigated (e.g., via instructions 802, etc.) to the merchant 102. An "Arrived" interface 900, then, as shown in FIG. 9, may be displayed to the consumer 112 when the consumer 112 ultimately arrives at the merchant 102.

In connection therewith in the method 400, the consumer application 124 displays, at 428, at the presentation unit 206 of the communication device 122, one or more items and specific details of one of more items offered by the merchant 102 as part of an AR experience at the merchant 102. In particular, as the consumer 112 browses the merchant 102, the consumer 112, using the consumer application 124, points the camera input device 208 of the communication device 122 to frame various areas and/or items of the merchant 102, whereby the areas and/or items in frame are displayed at the presentation unit 206 of the communication device 122. When an item in frame is included in the merchant profile and within a sufficient proximity of the camera input device 208, the consumer application 124 overlays, in real-time, item metadata as AR content on the image and/or video captured by the camera input device 208 and displayed at the presentation unit 206. Item metadata overlaid as AR content may include, for example, and without limitation, the item name, item details (e.g., an item description, item pricing, item value, etc.), an item image (e.g., a three-dimensional image, etc.), etc. Item metadata overlaid as AR content may further include, for example, a suggested companion item(s) and/or an ingredient list(s) and/or recipe(s) related to the item (or type thereof). Where, for example, a suggested companion item(s) is overlaid as AR content, an image(s) (e.g., a three-dimensional image(s), etc.) for the companion item may also be overlaid as AR content (e.g., automatically or based on the consumer's selection of the companion item in an overlaid list of companion items, etc.).

In some embodiments, the item metadata available for all items in frame of the communication device 122 (e.g., in frame of the camera input device 208 of the communication device 122, etc.) may be displayed to the consumer 112. Alternatively, in some embodiments the consumer 112 may be provided with an option to select one or more of the items in the frame of the communication device 122, whereby the consumer application 124 then overlays item metadata as AR content on the given image and/or video captured by the camera input device 208 and displayed at the presentation unit 206 for the selected item(s). In connection therewith, in various embodiments the consumer application 124 may be configured to identify the given item(s) in the frame of the communication device 122 based on suitable item recognition processes such as, for example, image-based identification matching (by comparing the image(s) in the frame of the communication device 122 with stored images, stored metadata, etc.), through use of Bluetooth low energy (BLE) devices associated with the item(s) and based on information exchanged and comparisons with stored metadata (e.g., through use of iBeacons associated with the items, etc.), through use of QR codes associated with the item(s) and scans and/or recognition thereof (e.g., by the input device 208 of the communication device 122, as recognized within the frame of the communication device 122, etc.), by leveraging location and/or orientation capabilities of the communication device 122 itself (e.g., where the items in the merchant are generally constant (such as for a menu board in a restaurant merchant, etc.)), etc.

FIGS. 10A-10D illustrate exemplary interfaces 1000A, 1000B, 1000C, and 1000D, which may be displayed to the consumer 112 at his/her communication device 122 and which include different items offered by the merchant 102 and included in the merchant AR response from the content platform 118. From the interfaces in FIGS. 10A-D, the consumer 112 is able to browse the items offered by the merchant 102, and potentially, as desired, initiate a purchase of one or more of the items (e.g., upon selection of one of the items at the communication device 122 (e.g., as a user input to the input device 208 of the communication device 122, etc.), etc.).

Finally in the method 400, when the consumer 112 opts to purchase an item at the merchant 102, the consumer 112 inputs a selection of the item(s) to the communication device 122 (via the consumer application 124) for initiating the purchase, at 430. The consumer 112 may select an item viewable within the frame of the camera input device 208 as part of the AR experience or, in some embodiments, the consumer 112 may select the item from a list of items displayed via the consumer application 124. In either case, in response to the consumer's selection, the consumer application 124, at 432, initializes a payment application, which may be incorporated, in whole or in part, with the consumer application 124, or which may be separate therefrom. As described above, the payment application includes payment account credentials for the consumer's payment account (e.g., the consumer's name, address, payment account number, device expiration date, CVV number, etc.). As part of the initiation of the payment application, the consumer 112 is authenticated to the payment application (e.g., via a PIN, biometric, code, etc.), whereby the consumer 112 may pay for the selected item(s) via the payment application. In connection therewith, when the consumer 112 is authenticated, the merchant 102 receives, at 434, the credentials for the consumer's payment account from the payment application, via the consumer application 124 in this example, and generates an authorization request for the transaction to be funded by the payment account (thereby generally initiating the transaction). The merchant 102 then transmits the authorization request to the issuer 108, via the acquirer 104 and the payment network 106. Upon receipt, the issuer 108 determines if the consumer's payment account is in good standing and if there are sufficient funds and/or credit to cover the transaction. If approved, an authorization reply (indicating the approval or decline of the transaction) is transmitted by the issuer 108 back to the merchant 102, thereby permitting the merchant 102 to complete the transaction (when approved), at 436.

Separately, when the consumer 112 submits the merchant AR request (e.g., upon arrival at the merchant 102, etc.), the merchant application 120 is notified. Alternatively, or additionally, the merchant application 120 may detect the consumer 112, via a camera input device 208 of the terminal device 114, or otherwise, when the consumer 112 enters the merchant 102 (e.g., by detecting the application ID of the consumer application 124, etc.). The notification to the merchant 102 and specifically, the user 116, at the merchant application 120 may include, generally, one or more details about the consumer 112 (e.g., purchase history at the merchant 102, name, photo of the consumer 112, birthday, gender, etc.).

When the details include a prior transaction history of the consumer 112 at the merchant 102, the merchant application 120 may determine that the consumer 112 is a loyal consumer (e.g., more than two transactions at the merchant 102 in the last month, etc.), or a lapsed consumer (e.g., several prior transactions, but none in the last six months, etc.), or other type of consumer. The merchant application 120 may then inform the user 116 of the type of consumer entering the merchant 102, along with a photo of the consumer 112, the name and/or birth month, etc., whereby the merchant 102 might offer the consumer 112 a free drink or food item or other incentive (e.g., via the merchant application 120 and/or in person, etc.). For example, and without limitation, where the offer is provided to the consumer 112 via the merchant application 120, the user 116 may use the terminal device 114 to transmit a notification of the offer to the content platform 118, which may in turn transmit the offer to the consumer application 124 for display to the consumer 112. Alternatively, the terminal device 114, in response to receiving one or more details about the consumer 112, may automatically transmit the notification of the offer to the content platform 118 for transmission to the consumer application 124. In addition, instead of transmitting a notification of the offer to the content platform 118, the notification may be transmitted to the consumer 112 by other means (e.g., directly to the communication device 122, etc.). As another example, and without limitation, the offer may be provided to the consumer 112 in person (e.g., by the user 116, etc.). It should be appreciated that where the consumer 112 receives a notification of the offer via the consumer application 124, the offer may be displayed to the consumer as part of the AR experience.

What's more, where the consumer 112 uses the payment application to pay for an item(s) selected as part of the AR experience, activity parameters regarding the user's selection of the item(s) and/or payment transaction details for the purchase of the selected item(s) may be provided to the content platform 118, whereby the content platform 118 may correlate the activity parameters with increased (or decreased) conversion (e.g., determine that consumers are more likely to purchase a particular item or type of item when shopping with the AR experience (e.g., high value items, everyday items, etc.), etc.).

In view of the above, the systems and methods herein provide not only provide access to items provided by a merchants in a vicinity of a consumer (or elsewhere), but the consumer is also informed of the AR experience potential with the merchants. In this manner, the consumer may opt for a more robust AR experience by selecting a merchant with a more intense AR quotient. The consumer may then be informed of the AR experience at the merchant prior to even arriving at the merchant. This may provide an efficient driver of consumers to merchants, who prioritize and/or optimize AR experiences for consumers.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, an augmented reality (AR) search request from a user (e.g., a consumer, etc.), the AR search request including a search criteria and a location; (b) searching, by the computing device, in a memory, for at least one entity consistent with the search criteria and the location; (c) returning, by the computing device, an AR search response to the user, at an application (e.g., a consumer application, etc.) of a communication device associated with the user, the AR search response including an AR quotient indicative of a level of an AR experience at the at least one entity, thereby permitting the user to identify the level of the AR experience at the at least one entity prior to deciding to visit the at least one entity; (d) determining, by the computing device, the AR quotient for the at least one entity based on at least one of AR quality, AR quantity, AR accuracy, and AR relevance of the at least one entity.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in augmented reality experiences in connection with items offered by entities, the method comprising:
   determining, by a computing device, an augmented reality (AR) quotient for at least one entity based on a number of items, at the at least one entity, associated with AR content in an AR experience at the at least one entity, the AR quotient indicative of a level of the AR experience at the at least one entity;
   receiving, at the computing device, an AR search request from a communication device associated with a user, the AR search request including a search criteria and a location;
   identifying, by the computing device, in a memory, the at least one entity based on the search criteria and the location; and
   returning, by the computing device, an AR search response to the user, at an application of the communication device associated with the user, the AR search response including the AR quotient indicative of the level of the AR experience at the at least one entity, thereby permitting the user to identify the level of the AR experience at the at least one entity prior to deciding to visit the at least one entity.

2. The computer-implemented method of claim 1, wherein receiving the AR search request from the user includes receiving the AR search request from the user via a content platform, through an application programming interface (API) call from the content platform.

3. The computer-implemented method of claim 2, wherein returning the AR search response to the user at the application of the communication device includes returning the AR search request to the user via the content platform.

4. The computer-implemented method of claim 1, wherein the at least one entity includes at least one merchant, the method further comprising, after returning the AR search response to the user:
   receiving, at the computing device, a merchant AR request from the communication device associated with the user, the merchant AR request including a merchant ID for a selected one of the at least one merchant;
   searching, by the computing device, in the memory, for the merchant ID; and
   returning, by the computing device, a merchant AR response to the user, at the application of the communication device, the merchant AR response including at least metadata indicative of multiple items offered by the selected one of the at least one merchant, thereby permitting the application of the communication device to present the AR experience via the communication device when the user is located at the selected one of the at least one merchant.

5. The computer-implemented method of claim 4, wherein the merchant AR response further includes the AR quotient and metadata, thereby permitting the application of the communication device to present details of the at least one merchant to the user.

6. A non-transitory computer readable storage media including executable instructions for use in an augmented reality (AR) experience in connection with one or more merchants, which when executed by at least one processor, cause the at least one processor to:
   submit an AR search request to a data structure;
   receive an AR search response to the AR search request from the data structure, the AR search response including at least one merchant and an AR quotient associated with the at least one merchant, the AR quotient indicative of a level of an AR experience available at the at least one merchant, wherein the AR quotient is based at least on a number of items, at the at least one merchant, associated with AR content available in the AR experience at the at least one merchant; and
   provide an AR view at a presentation unit associated with a consumer, the AR view including an indicator representative of the at least one merchant and a visual feature associated with the indicator representative of the AR quotient, whereby the AR view permits the consumer to identify the level of the AR experience at the at least one merchant based on the indicator.

7. The non-transitory computer readable storage media of claim 6, wherein the AR view includes the indicator overlaid on a street view of a vicinity of a location of a communication device including the presentation unit, as captured by a camera input device of the communication device.

8. The non-transitory computer readable storage media of claim 6, wherein at least one of a size and a color of the indicator representative of the at least one merchant is representative of the level of the AR experience.

9. The non-transitory computer readable storage media of claim 6, wherein the executable instructions, when executed by the at least one processor, further cause the at least one processor to:
submit a merchant AR request to the data structure, in response to a consumer selection of the at least one merchant;
receive a merchant AR response to the merchant AR request from the data structure, the merchant AR response including at least one of the items offered by the at least one merchant and associated with AR content in the AR experience available at the at least one merchant; and
display the at least one of the items, at the presentation unit, thereby permitting the consumer to select the at least one of the items for purchase.

10. The non-transitory computer readable storage media of claim 9, wherein the executable instructions, when executed by the at least one processor, further cause the at least one processor to initiate a payment account transaction for the at least one of the items selected by the consumer from the displayed at least one of the items.

11. A system for use in facilitating augmented reality (AR) experiences in connection with items offered by merchants, the system comprising a computing device having at least one processor, the at least one processor configured to:
submit an AR search request to a data structure;
receive an AR search response to the AR search request from the data structure, the AR search response including at least one merchant and an AR quotient associated with the at least one merchant, the AR quotient indicative of a level of an AR experience at the at least one merchant, wherein the AR quotient is based on a number of items, offered by the at least one merchant, associated with AR content available in the AR experience at the at least one merchant;
provide an AR view, at a presentation unit associated with a consumer, where the AR view includes an indicator representative of the at least one merchant and where a visual feature of the indicator is representative of the AR quotient, thereby permitting the consumer to identify the level of the AR experience at the at least one merchant based on the indicator; and
initiate a payment account transaction for an item selected by the consumer from the items offered by the at least one merchant.

12. The system of claim 11, wherein the AR view includes the indicator overlaid on a street view of a vicinity of a location of a communication device including the presentation unit, as captured by a camera input device of the communication device.

13. The system of claim 11, wherein at least one of a size and a color of the indicator is representative of the level of the AR experience.

14. The system of claim 11, wherein the at least one processor is further configured to:
submit a merchant AR request to the data structure, in response to a consumer selection of the at least one merchant;
receive a merchant AR response to the merchant AR request from the data structure, the merchant AR response including at least one of the items offered by the at least one merchant; and
display the at least one of the items, at the presentation unit, thereby permitting the consumer to select the item from the at least one of the displayed items for purchase.

15. The system of claim 14, wherein the merchant AR response includes metadata for the at least one of the items.

16. The system of claim 15, wherein the computing device comprises a camera input device; and
wherein the at least one processor is further configured to display the at least one of the items, at the presentation unit, by overlaying the metadata for the at least one of the items as AR content on an image and/or video captured by the camera input device.

17. The system of claim 16, wherein the metadata for the at least one of the items includes one or more of a price for the at least one of the items, a description of the at least one of the items, an image of the at least one of the items, and a suggested companion product for the at least one of the items.

18. The system of claim 16, wherein the metadata for the at least one of the items includes a three-dimensional image of the at least one of the items.

* * * * *